United States Patent [19]

Bolick, Jr.

[11] 4,357,642

[45] Nov. 2, 1982

[54] TAPE CASSETTE WITH HOUSING PROVIDING SELECTIVE REMOVAL OF ONLY ONE TAPE REEL

[75] Inventor: Fred C. Bolick, Jr., Atlanta, Ga.

[73] Assignee: Lanier Business Products, Inc., Atlanta, Ga.

[21] Appl. No.: 278,097

[22] Filed: Jun. 29, 1981

Related U.S. Application Data

[63] Continuation of Ser. No. 93,165, Nov. 13, 1979.

[51] Int. Cl.³ .................. G11B 15/60; G11B 23/02
[52] U.S. Cl. ........................... 360/132; 360/130.33
[58] Field of Search ............. 360/132, 137, 130.33, 360/13

[56] References Cited

U.S. PATENT DOCUMENTS 3,495,782 2/1970 Nelson et al. .................. 360/13
4,191,984 4/1980 Tsukidate et al. .............. 360/132
4,249,710 2/1981 Dobbs et al. ................... 242/199

Primary Examiner—Vincent P. Canney
Attorney, Agent, or Firm—Jones & Askew

[57] ABSTRACT

A cassette, apparatus, and method for obtaining selected segments of magnetic tape for storage or other purposes from a length of magnetic tape upon which information is recorded by a conventional cassette recorder. The cassette has means for removing a take-up reel and a selected segment of the magnetic tape attached to the take-up reel from the cassette while at the same time retaining the supply reel in operational position within the cassette. The apparatus includes means for positioning a second take-up reel relative to the cassette; tape positioning means for positioning a selected segment of the tape in a clamping position between the second take-up reel and a finger extending from the take-up reel, and means for clamping the segment of tape to the second take-up reel. The method comprises steps of removing a take-up reel and an attached selected segment of magnetic tape from a cassette with a leader segment between the selected segment of the magnetic tape and a remaining segment of the magnetic tape attached to the supply reel, securing a new take-up reel to the leader segment of the magnetic tape, severing the selected segment of tape, and placing the new take-up reel and leader segment in operative position within the cassette.

1 Claim, 6 Drawing Figures

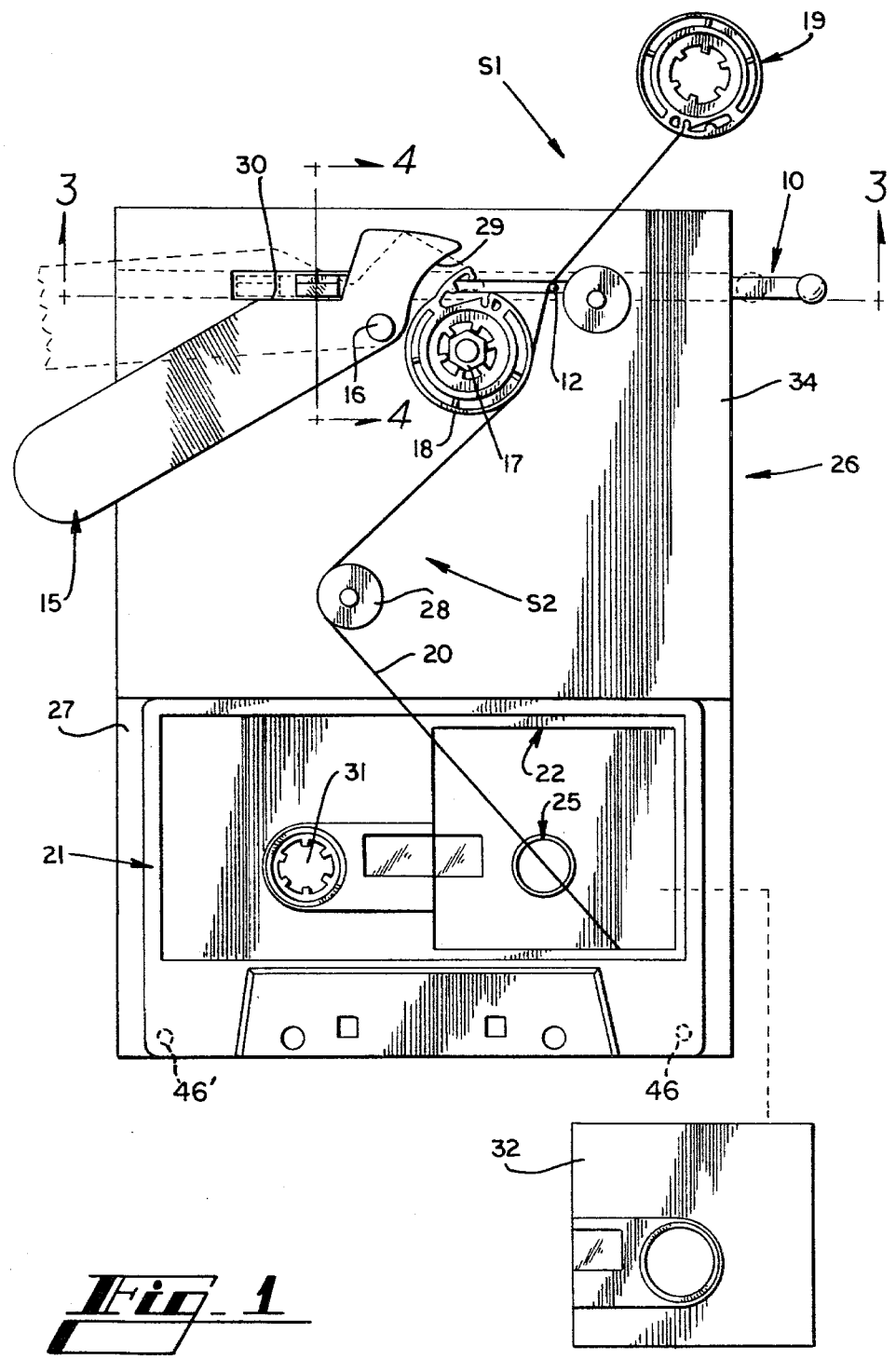
Fig_1

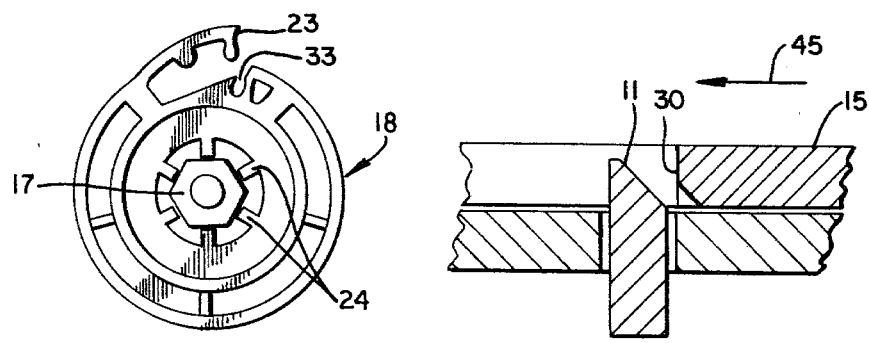
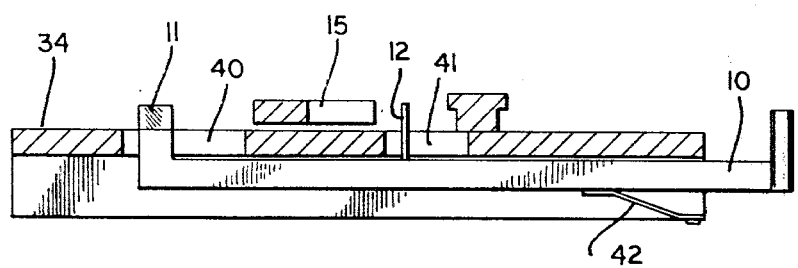
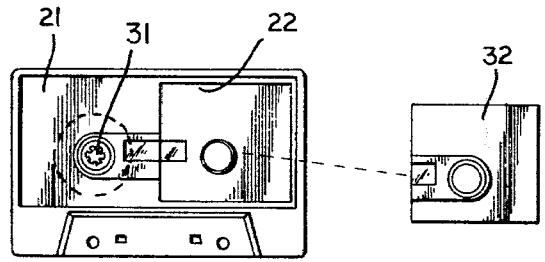
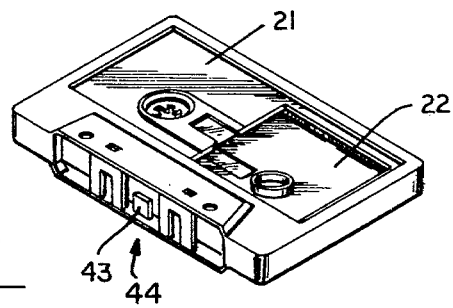

4,357,642

TAPE CASSETTE WITH HOUSING PROVIDING SELECTIVE REMOVAL OF ONLY ONE TAPE REEL

This application is a continuation of application Ser. No. 93,165, filed Nov. 13, 1979.

BACKGROUND OF THE INVENTION

The invention disclosed herein relates to cassettes for recording information and more particularly to a cassette, apparatus and method for removing selected segments for storage and other purposes from a recording medium having particular information recorded in particular segments of its length. In applications where it is desirable to record a large number of relatively short segments of audio information, such as witness interviews for insurance investigations, it has been found that use of conventional cassette recorders provides the features of good fidelity, portability and ease of handling. However, experience has shown that the storage of entire conventional cassettes in files is bulky and wastes a great deal of space, especially when only a small percentage of the available recording time is used on each cassette. Moreover, when it is necessary that each file contain only particular recorded information, the storing of entire cassettes is costly since there must be a cassette for each file even though the particular recorded information in the file requires only a small portion of the tape available in a cassette.

Thus, to avoid the wasted space, bulk and expense involved in the storage of complete cassettes or a pair of reels from a cassette, it is desirable to remove segments from the length of tape in a cassette for storage while at the same time leaving the cassette operational to record information on any segments of the length of the tape which do not require storage or are unused. To accomplish this method of storage, some users have extracted the tape through the front opening of a conventional cassette, cut out the portion on which the information to be stored is recorded, and spliced the remaining ends back together. However, there are several problems with this method of removing small segments from the length of tape in a cassette for storage or other purposes.

The splicing operation is time consuming and difficult to master, especially with the one-eighth inch width tape used in standard cassettes. Also, the physical strength of the splice may be inferior to that of the tape and can lead to breakage during subsequent use. Unless the splice is done with great precision, the splice can lead to clogging of the tape head gap, or to the tape becoming wrapped around a transport spindle or capstan.

Prior art cassettes have provided no ready alternative to this splicing method and its problems since they have been of two types: those glued or in some other fashion permanently closed; and those held together by screws so that the top portion and bottom portion of the cassette body may be separated by removing the screws. To remove and store a small segment of the tape in a cassette of the first type, only the above described splicing method may be used.

While it is possible to disassemble prior art cassettes of the second type so that the take-up reel and a segment of the length of tape in the cassette may be removed as an alternative to the splicing of tape described above, these prior art cassettes require that the entire interior of the cassette be exposed with the result that the supply reel and those segments of the tape remaining in the cassette may be dislodged from their operational positions. Even when this does not occur, the obtaining of a segment of the length of tape from those prior cassettes of the second type for storage is time consuming because of the screws to be removed and the difficulty generally encountered in attaching the remaining segments of the tape to a new take-up reel for additional use in the cassette.

SUMMARY OF THE INVENTION

The present invention overcomes the foregoing described and other problems encountered in the prior art with respect to removing small segments from the length of tape in a cassette for storage after the cassette has been used on a conventional cassette recorder to record audio information. This is because the present invention provides a cassette from which segments of the tape within the cassette may be conveniently removed, an apparatus for quickly and conveniently removing a segment from the length of tape in a cassette embodying the invention disclosed herein, and a method of removing segments from the length of tape in a cassette.

As embodied in a cassette, the invention provides a cassette having a body with a selectively removable portion which allows access to the take-up reel and a segment of the length of tape in the cassette without allowing the operational position of the supply reel or the path of the remaining segments of the tape through the carrier guide means to be disturbed.

As embodied in apparatus for removing a segment of tape, the invention provides apparatus having a means for positioning a second take-up reel relative to the cassette and to a first take-up reel which has been removed from the cassette with a selected segment of the magnetic tape attached and with a leader segment extending between the selected segment of the magnetic tape and a remaining segment of the magnetic tape attached to a supply reel within the cassette; tape positioning means for positioning the selected segment and leader segment of the magnetic tape by engaging a portion of the leader segment of the magnetic tape in a clamping position between the second take-up reel and a finger extending from the take-up reel, and operating means for moving the finger through the clamping position to clamp the portion of the leader segment of the magnetic tape to the take-up reel, and displacing means for removing the tape positioning means from the clamping position as the finger is moved through the clamping position by the operating means.

Furthermore, as embodied in a method of removing segments of tape, the invention provides a method comprising the steps of removing a take-up reel and an attached selected segment of magnetic tape from a cassette with a leader segment between the selected segment of the magnetic tape and a remaining segment of the magnetic tape attached to the supply reel while simultaneously retaining the supply reel and the remaining segment of the magnetic tape in operational position within the cassette, securing a new take-up reel to the leader segment of the magnetic tape where it joins the selected segment of the magnetic tape, severing the selected segment of the magnetic tape from the leader segment and the new take-up reel, and placing the new take-up reel and leader segment of the magnetic tape in operative position within the cassette.

Accordingly, it is an object of the invention disclosed herein to provide a cassette, apparatus, and method for quickly and conveniently obtaining a segment of the tape within a cassette for storage separate from the cassette and segments of tape remaining in the cassette.

In addition, it is an object of this invention to provide a cassette compatible with conventional cassette record and playback apparatus and from which segments of tape may be easily removed for storage or other purposes.

It is another object of this invention to provide a cassette from which small segments of tape may be removed and the remaining tape in the cassette may then be used.

It is a further object of this invention to provide apparatus which permits small segments of tape to be conveniently severed from the tape in a cassette while leaving the segments of the tape remaining in the cassette available for subsequent use in a conventional cassette recorder.

It is still a further object of this invention to provide a method of obtaining segments from the length of tape in a cassette for storage in a space that is less than ten percent of that space which would be required to store an entire cassette.

These and other objects of this invention will become apparent from the detailed description below of the preferred embodiment of the cassette apparatus and method of the invention disclosed herein.

BRIEF DESCRIPTION OF THE DRAWINGS

FIG. 1 is a top view of the preferred embodiments of the apparatus and cassette of the present invention.

FIG. 2 is a planar view of a cassette reel mounted on the reel holder of the apparatus shown in FIG. 1.

FIG. 3 is a cross-sectional view of the apparatus shown in FIG. 1 taken in line 3—3 in FIG. 1.

FIG. 4 is a cross-sectional view in line 4—4 as shown in FIG. 1.

FIG. 5 is a plan view of the preferred embodiment of the cassette of the present invention.

FIG. 6 is a pictorial view of the preferred embodiment of the cassette.

DETAILED DESCRIPTION

The present invention may be most easily understood by referring to FIG. 1 and by assuming that a segment S1 of the tape 20 in a cassette 21 is to be removed from the cassette 21 for storage or some other purpose. To accomplish this purpose, the apparatus 26 comprises cassette holding means 27 which in the preferred embodiment is a depression with a spindle 31 aligned under the center of the supply reel spindle hole of the cassette 21. This secures a cassette 21 in place while the apparatus is used to remove segments from the tape within the cassette.

It will be understood that initially the segment S1 to be stored is within the cassette 21 and wound around the take-up reel 19 of the cassette 21. Thus, if the cassette 21 is a prior art cassette, access to the segment S1 would require that the entire upper portion of the cassette 21 be removed or that the tape be extracted from one of the front openings of the cassette. However, the cassette of the present invention has a removable plate 32 comprising a portion of the top of the cassette positioned over the take-up reel so that the removal of the plate 32 exposes the take-up reel through opening 22.

It will be understood that the removal of plate 32 does not disturb the supply reel shown in phantom in FIG. 5 which is positioned around spindle 31. Likewise, the removal of plate 32 and the subsequent removal of take-up reel 19 from cassette 21 as shown in FIG. 1 in no way disturbes the path of tape 20 from the supply reel to opening 22. It will also be understood that the invention may be embodied in any conventional cassette such as a cassette of the type described in U.S. Pat. No. 3,394,899. As is well known to those skilled in the art, such cassettes have a transport transducer interface opening 44 in the front thereof so that the pinch roller and heads of recording/playback apparatus may contact the tape.

As is further known to those skilled in the art, the reels within conventional cassettes are mounted on annular portions of the top and bottom portions of the cassette body, said annular portion providing a means for retaining the reel in place and an access for the transport spindles. However, regardless of the type of cassette in which the invention is embodied, the invention provides a selectively removable plate positioned over an opening of sufficient size to allow removal of one reel with tape wound thereon but not so large as to disturb the other reel or the path of the tape through the cassette past pressure pad 43 and guide posts 46 and 46' shown in phantom in FIG. 1.

After the removable cover plate 32 is removed. A second take-up reel 18 is placed on a reel holder 17 which is hexagonal in the preferred embodiment as can be seen from FIG. 2. As is known to those skilled in the art, a cassette reel such as take-up reel 18 has six teeth 24 pointing radially inward. Each of these teeth communicate with one of the sides of reel holder 17 which serves as a reel positioning means for preventing rotation of reel 18.

The take-up reel 19 is then removed, pulling the segment S1 and a leader segment S2 of tape 20 with it. Tape 20 is placed along a path as shown in FIG. 1 by passing the leader segment S2 around tape guide 28, around the right-hand portion of the circumference of a substitute take-up reel 18, and then to the left side of tape securing pin 12 with the distal end of the leader segment engaging the pin 12.

As can be seen from FIG. 1, the apparatus 26 includes slider rod 10 which has the tape securing pin 12 and a rod depressing beveled cam 11 attached thereto. Slider rod 10 is slidable parallel to the rear of cassette 21 and when slider rod 10 is moved to the left or right as seen in FIG. 1, the tape securing pin 12 and cam 11 travel in slots 41 and 40 respectively. As can be seen from FIG. 3, slider rod 10 is pushed toward the top of reel replacement apparatus 26 by spring 42. As can be seen from FIG. 1, reel replacement apparatus 26 also includes tape clamping lever 15 pivoted about pivot pin 16 and having cam engaging surface 30 and arcuate clamping surface 29.

To secure tape 20 on the second take-up reel 18, the user moves slider rod 10 as far as it will travel to the left as shown in FIG. 1. This causes tape securing pin 12 to push the distal end of the leader segment S2 of the tape 20 between clamping lobe 23 and slot 33 (see FIG. 2) of the substitute take-up reel 18. Then tape clamping lever 15 is rotated clockwise as shown in FIG. 1 around pin 16. In response to this rotation, surface 30 engages cam 11 thus pushing the left-hand end of rod 10 down toward the bottom of reel replacement apparatus 26 in FIG. 4 shows how surface 30 engages cam 11 as surface 30 moves in the direction of arrow 45 which corresponds to clockwise movement of clamping lever 15 shown in FIG. 1.

Since tape securing pin 12 is also attached to slider rod 10, it is lowered along with cam 11 in response to the rotation of tape clamping lever 15 as clamping surface 29 approaches clamping lobe 23. When tape clamping lever 15 has been rotated so that cam 11 is completely depressed, tape securing pin 12 has retreated below surface 34 so as to be out of the path of tape clamping surface 29 and thus out of the path of closure of the hinged clamp member of reel 18 which contains clamping lobe 23. However until pin 12 has completely retreated below surface 34 it has held a loop of tape 20 in place between tape clamping lobe 23 and slot 33. Further rotation of tape clamping lever 15 pushes lobe 23 into slot 33 with the loop in the distal end of the leader segment 52 of tape 20 in between. Due to the shape of lobe 23 and slot 33 the two become securely locked together and the distal end of the leader segment S2 of the tape is very tightly clamped in slot 33.

The selected segment 31 of the tape connecting take-up reels 19 and 18 is then cut and the tape wrapped on first take-up reel 19 for storage, while second take-up reel 18 is placed on spindle 25 and plate 32 is then replaced over opening 22. Now cassette 21 is ready for further use in conventional cassette recording equipment.

The above description of the preferred embodiment of the present invention is by way of illustration and it will be understood that other embodiments of this invention are possible within the spirit and scope of the following claims.

I claim:
1. A tape carrier for use in a tape recording-reproducing apparatus, comprising:
   a supply reel carrying a length of a recording medium;
   retaining means for securing said supply reel in position for rotation about a hub within said tape carrier;
   a pressure pad in communication with the tape extending from said supply reel, said pressure pad positioned in said tape carrier to cause said tape in communication with said pressure pad to be operatively accessible to a tape recording-reproducing apparatus;
   a take-up reel positioned to receive tape which has been withdrawn from said supply reel and passed in communication with said pressure pad; and
   an access means comprising an opening in said tape carrier for providing sufficient external access to said take-up reel to permit said take-up reel to be removed from said tape carrier without disturbing the path of said tape in communication with said pressure pad while said retaining means continues to prevent removal of said supply reel from said position for rotation about said hub,
   said access means further comprising a removable cover means for covering said take-up reel when said tape carrier is in condition for operation and which may be removed to permit access to said take-up reel.

* * * * *